US012251646B2

(12) United States Patent
Osnato

(10) Patent No.: US 12,251,646 B2
(45) Date of Patent: Mar. 18, 2025

(54) UV-LIGHT DRAWING ACTIVITY

(71) Applicant: WeCool Toys Inc., Point Pleasant, NJ (US)

(72) Inventor: Jeffrey Osnato, Medford, NJ (US)

(73) Assignee: WeCool Toys Inc., Point Pleasant, NJ (US)

( * ) Notice: Subject to any disclaimer, the term of this patent is extended or adjusted under 35 U.S.C. 154(b) by 0 days.

(21) Appl. No.: 18/446,083

(22) Filed: Aug. 8, 2023

(65) Prior Publication Data

US 2023/0381682 A1 Nov. 30, 2023

Related U.S. Application Data

(63) Continuation of application No. PCT/US2022/015662, filed on Feb. 8, 2022.

(60) Provisional application No. 63/199,991, filed on Feb. 8, 2021.

(51) Int. Cl.

| | |
|---|---|
| ***A63H 33/22*** | (2006.01) |
| ***A63H 33/38*** | (2006.01) |
| ***B43K 23/008*** | (2006.01) |
| ***B43K 29/10*** | (2006.01) |
| ***B43L 13/20*** | (2006.01) |

(52) U.S. Cl.

CPC ............. *A63H 33/22* (2013.01); *A63H 33/38* (2013.01); *B43K 23/008* (2013.01); *B43K 29/10* (2013.01); *B43L 13/201* (2013.01)

(58) Field of Classification Search

CPC ........... G09F 13/42; G09C 5/00; G09B 11/06; F21V 33/008; B43K 23/008; B43K 29/10

See application file for complete search history.

(56) References Cited

U.S. PATENT DOCUMENTS

| | | | | |
|---|---|---|---|---|
| 2,732,761 | A | 1/1956 | Bender et al. | |
| 5,448,459 | A | 9/1995 | Rogers | |
| 5,673,996 | A | 10/1997 | Ducker | |
| 6,203,225 | B1 * | 3/2001 | Baudino | B43K 23/008 401/6 |
| 6,860,616 | B2 | 3/2005 | Yu et al. | |

(Continued)

FOREIGN PATENT DOCUMENTS

| | | | |
|---|---|---|---|
| WO | 2007025283 | A2 | 3/2007 |
| WO | 2007025283 | A3 | 4/2009 |

(Continued)

OTHER PUBLICATIONS

International Search Report and Written Opinion in PCT/US2022/015662, mailed Apr. 27, 2022, 9 pages.

*Primary Examiner* — Evan P Dzierzynski
*Assistant Examiner* — Nathaniel J Lee
(74) *Attorney, Agent, or Firm* — McKee, Voorhees & Sease, PLC

(57) ABSTRACT

An invisible tracing or drawing activity utilizes a universal self-adjusting UV lamp which forms part of or can attach to a grip which slides onto most writing instruments. The grip is flexible and can stretch to adjust so as to accommodate various sizes of drawing utensils. Blueish (UV) light will reveal hidden artwork that can be traced, drawn, or colored within. Coloring books act as collections of different and unique hidden artwork that can occupy a child's attention for hours, days, or in some circumstances, even weeks.

26 Claims, 1 Drawing Sheet
(1 of 1 Drawing Sheet(s) Filed in Color)

(56) References Cited

U.S. PATENT DOCUMENTS

| | | | | |
|---|---|---|---|---|
| 7,182,667 | B2 | 2/2007 | Wittmeyer, Jr. | |
| 2005/0014442 | A1* | 1/2005 | Wittmeyer ............ | G09B 11/06 446/147 |
| 2005/0036303 | A1 | 2/2005 | Yu et al. | |
| 2006/0045604 | A1* | 3/2006 | Fukui .................. | B43K 24/084 401/6 |
| 2007/0109770 | A1 | 5/2007 | Schmidt et al. | |
| 2007/0272757 | A1* | 11/2007 | Pomranc ............... | B42D 1/009 235/491 |
| 2014/0141689 | A1 | 5/2014 | Yasuda et al. | |
| 2014/0219702 | A1* | 8/2014 | Pincus ................ | B43K 23/008 401/6 |
| 2014/0325401 | A1* | 10/2014 | Wattenhofer .... | H04N 21/44204 709/224 |
| 2016/0207680 | A1* | 7/2016 | Streich .................. | B65D 77/26 |
| 2017/0354012 | A1* | 12/2017 | Bard ..................... | H05B 45/24 |

FOREIGN PATENT DOCUMENTS

| | | | |
|---|---|---|---|
| WO | 2012050691 | A2 | 4/2012 |
| WO | 2012050691 | A3 | 10/2012 |
| WO | 2018112467 | A1 | 6/2018 |
| WO | WO-2021207524 | A1 * | 10/2021 |

* cited by examiner

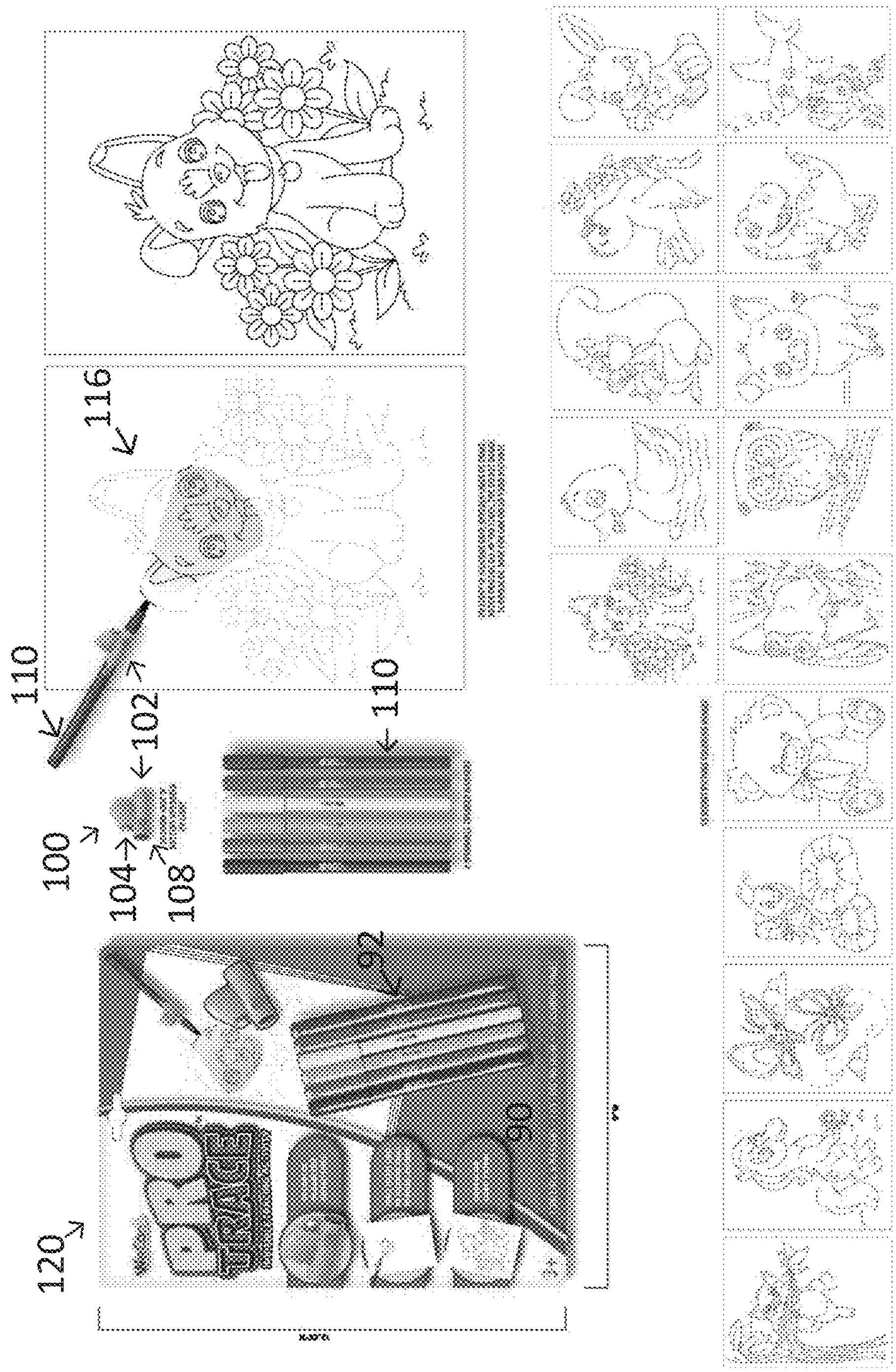
110
102
116
100
104
108
110
120
92
90

UV-LIGHT DRAWING ACTIVITY

CROSS REFERENCE TO RELATED APPLICATIONS

This application is a by-pass Continuation of PCT/US2022/015662, filed Feb. 8, 2022, which claims priority to provisional patent application U.S. Ser. No. 63/199,991, filed Feb. 8, 2021; the entire contents of each are herein incorporated by reference in entirety, including without limitation, the specification, claims, and abstract, as well as any figures, tables, appendices, or drawings thereof.

FIELD OF THE INVENTION

The present invention relates generally to an apparatus and corresponding method of use in at least the toy, arts, and/or crafts industries. More particularly, but not exclusively, the present invention relates to a drawing activity utilizing silicone grip with a battery-operated UV-light.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Children love toys, games, and activities. For children, toys, games, and activities are more than just fun. Most provide at least some opportunity for children to learn. The best toys engage the senses and spark imaginations. The best activities encourage children to interact with others and teach teamwork.

From a very early age, children are eager to learn more about the world around them. Every new shape, color, texture, taste, and sound presents an opportunity to learn more. Parents quickly identify giving their children toys that are safe and stimulating will help their children discover their senses. Rattles and toys that make music are favorites of infants. Toys with contrasting colors are fascinating to babies and stimulate their developing vision. As they grow, infants can use toys to explore object permanence and cause and effect relationships. They also need objects such as blocks to help them build motor skills and hand-eye coordination.

Toddlers can play with a wider variety of toys than infants. Toddlers may still enjoy some of the toys they played with as babies, however they also need that are designed with their increased capability to learn in mind. Even the same blocks they played with previously can provide them with new and different educational opportunities as their knowledge expands. Shape sorters are great for toddlers. They teach them how to match similar items and provide parents the opportunity to teach them the names of the shapes. Lego® blocks, for example, provide an opportunity to learn more about colors and symmetry developing a child's motor skills.

When children reach schooling age, parents and teachers shift their focus from helping children discover their senses to developing a child's aptitude for lingual (e.g., written and spoken), numeric, memorial, and social skills. There are a lot of toys that encourage this type of learning, from simple alphabet puzzles to high-tech electronic gadgets. These toys help give children a head start by introducing them to the things they will be learning in school. Kids who are in school can supplement their learning with recreational and educational toys. Giving children the opportunity to have fun while practicing the things they are learning in school will increase their retention of those things.

The act of collecting toys offers an opportunity for a child to make an emotional connection with their toys. Not surprisingly, the value a child assigns to any given collection is not monetary but sentimental. Thus, some connections are stronger than others. The collections allow children to relive previous experiences and connect themselves to a period or to a time they feel strongly about. This in effect helps ease insecurity and anxiety and allows the past to continue to exist in the present. Some children collect for the thrill of the hunt. For these children, collecting is a quest, and may develop into a lifelong pursuit which can never be completed. When children collect, they experiment with arranging, organizing, and presenting a part of the world which may serve to provide a safety zone, a place of refuge where fears are calmed, and insecurity is managed. Motives are not mutually exclusive, rather, different motives combine for each collector for a multitude of reasons.

It is often a challenge for creators of games and activities to establish for kids a unique emotional connection to each and every individual experience a child has. Often, children learn a set of rules, and differentiate only between their favorite games or activities, rather than individual experiences within those activities. For example, most people might remember fondly playing T-ball and soccer as a child, but rarely remember specific at-bats, defensive plays, scoring runs, making specific passes, and the like. The issue of creating strong emotional connections with individual experiences is even more vulnerable for those children who do not enjoy team sports.

Thus, there exists a need in the art for toys and activities which address these issues and complement the use of expensive, high-tech electronic gadgets.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

It is still yet a further object, feature, or advantage of the present invention to keep a child's attention by way of an invisible tracing activity. For example, a silicone grip with a battery operated UV-light attached to a drawing utensil may be used to reveal lines of an object. A child may then use the drawing utensil to trace those lines and/or color within the boundaries created by those lines.

It is still yet a further object, feature, or advantage of the present invention to provide a toy which can be used by children of different skillsets and skill levels.

It is still yet a further object, feature, or advantage of the present invention to provide a child the ability to engage in an activity which can be practiced along and/or while playing with other children. For example, a means for engaging social media may be provided with the toy.

It is still yet a further object, feature, or advantage of the present invention to provide a toy that may be played with in a wide variety of applications. For example, children can collect finished pictures (e.g., pictures), play with individual components of the toy (e.g., a marker), or form new toys (e.g., a collage) through the assembly of different components of the toy.

It is still yet a further object, feature, or advantage of the present invention to provide a toy that is safe (e.g., non-toxic, eliminates choking hazards, etc.), cost effective, and durable.

At least one embodiment disclosed herein comprises a distinct aesthetic appearance. Ornamental aspects included in such an embodiment can help capture a child's attention and/or identify a source of origin of a product being sold. Said ornamental aspects will not impede functionality of the present invention.

It is still yet a further object, feature, or advantage of the present invention to practice methods which facilitate use, manufacture, assembly, and repair of a toy accomplishing some or all of the previously stated objectives.

It is still yet a further object, feature, or advantage of the present invention to incorporate a toy into a system or kit accomplishing some or all of the previously stated objectives.

These and/or other objects, features, advantages, aspects, and/or embodiments will become apparent to those skilled in the art after reviewing the following brief and detailed descriptions of the drawings.

BRIEF DESCRIPTION OF THE FIGURE

The patent or application file contains at least one drawing executed in color. Copies of this patent or patent application publication with color drawing(s) will be provided by the Office upon request and payment of the necessary fee.

Several embodiments in which the present invention can be practiced are illustrated and described in detail, wherein like reference characters represent like components throughout the several views. The drawings are presented for exemplary purposes and may not be to scale unless otherwise indicated.

The FIGURE shows an illustrative view of a UV-light drawing system and/or activity.

An artisan of ordinary skill need not view, within isolated FIGURE(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

FIG. 1 shows components which are used for a UV-light drawing activity. In particular, a grip 100 having a silicone body 102, a UV-light fixture 104, battery 106 for the UV-light fixture 104, and a cavity 108 for a drawing utensil 110 is shown. The grip 100 can slide onto most writing instruments by stretching, via the silicone body 102, until the cavity 108 is large enough to fit snuggly around any such drawing utensil 110. Alternatively, the grip can be a snap-on grip.

In some embodiments, the grip 100 is a "gummy" which utilizes aesthetics to grab the child's interest and/or attention. Such aesthetics may comprise kid friendly shapes (e.g. hearts, stars, moons, suns, etc.), depictions of animals (either in shape or by way of a printed design), other primarily ornamental designs printed thereon, and the like.

It is also to be appreciated there exist embodiments where the UV-light fixture is located within utensils or apparatuses other than the drawing utensil 110 which complement said drawing utensil 110. For example, such a utensil or apparatuses can comprise, but is not limited to a magnifying glass, an eraser, a glue stick, a roll of tape, scissors, a pencil sharpener, a stapler, a calculator, a ruler, a utensil case (often referred to as a pencil case or a pencil box), protractor, highlighter, ring binder, and the like.

The UV-light fixture 104 will include a switch or button to control turning the light on and off, either attached to the lamp body or to the grip 100. Fixtures require an electrical connection to a power source, and thus a battery is preferably used. The UV-light fixture 104 utilizes a blacklight lamp and/or UV LEDs used to read the message written by UV ink and/or markers and emits near-ultraviolet light. This near-ultraviolet radiant energy is also called black light which fall just outside the visible spectrum with a wavelength of 380 nm. Such wavelength are very narrow and will fall within a much broader band than regular fluorescent black lights. Therefore, UV LEDs are completely safe for children to use. It will cause no damage to eyes nor risks of skin cancer. When the black light falls upon the UV-visible ink, it makes the ink fluoresce, where it emits visible light and make the message readable for human eyes. UV-light generally appears blue or violet to the human eye because the lamp typically includes a blue or violet filter material, either on the bulb or in a separate glass filter in the lamp housing, which blocks most visible light and allows through UV, so the lamp has a dim blue or violet glow when operating.

To further enhance safety, the drawing utensils 110 are of the type for use in play and/or crafts and are preferably non-toxic, and may comprise washable markers, colored pencils, crayons, and any other suitable instrument for delivering color to any appropriate receivable medium, typically paper included within a coloring book. It is also to be appreciated that there will exist at least some embodiments where the child is given possession of a UV marker to give the child greater customizability in their play experience.

The individual coloring pages will each have distinct, potentially-colored pattern(s) which result from where invisible, UV-sensitive lines 116 are located on the coloring page. The individual coloring pages can be of virtually any dimensional area (pocket book, standard 8.5×11 paper, A4 paper, etc.), thickness, shape (e.g., the outline of the paper can form objects, such as stars or hearts, or even animals, such as elephants or tigers), color, and/or material which is consistent with the functions and goals of the invention outlined herein. In embodiments where gummies are used for grip 100, the individual coloring pages can be similarly themed (e.g., the individual coloring pages might reveal a Safari theme, and the gummy may take the appearance of a lion). In some embodiments, the individual coloring pages can be removed from the coloring book by way of perforations, and the perforations may be located near the binding of the coloring book.

In particular, the UV-sensitive lines 116 can be formed with UV-invisible ink made by a fluorescent. The UV-invisible ink can be derived from things in nature that glow when exposed to an ultraviolet light or from dilute laundry detergent, body fluids, tonic water, and vitamin B-12 dissolved in vinegar. Although, there might be some circumstances where different types of UV-invisible ink are used: including opaque, semi-opaque and translucent inks. The aforementioned three types of ink can contain acrylic monomers which contain a diluent and a photoinitiator to participate in the curing reaction and to respond to UV radiation. Photoinitiators are a very important element for making the ink as it is the substance that absorbs the UV mission of a UV light, which enable UV markers to work.

The UV-light fixture 104 can shine UV-light onto the UV-sensitive lines 116 so as to reveal virtually any object, pattern, and the like by way of fluorescence. Fluorescence is caused by a conversion of energy; when the invisible ultraviolet falls on the fluorescent surface, it is absorbed and re-emitted as visible light radiation. The absorption of energy by the electrons in the UV-visible ink enables this to happen. When an extra amount of energy is absorbed, the electrons jump into higher energy orbital patterns surrounding the nucleus. Eventually, the energy is released as visible light when they fall back to their normal orbital shell. The difference between the original electron orbital and the new orbital pattern will determine the color of the fluorescent. After such UV-sensitive lines 116 are revealed, a child may then trace and/or color within those UV-sensitive lines 116 with the drawing utensil 110.

Children lacking the ability to draw more complex figures may be able to produce such figures with increased accuracy. Furthermore, it will mean that the child may also have the ability to opt not to "outline" a portion before coloring it in and thus being forced to include such an outline in the finished drawing. Particularly advantageously, the numbers of color by number systems can also form the invisible UV-sensitive lines 116. The numbers suggesting certain colors to be used to color portions of the coloring page can thus only temporarily revealed and can similarly not be included in the child's final work product (unless of course further UV-light is shone onto the coloring page).

It is to be appreciated the present disclosure contemplates the use of UV-sensitive lines 116 sensitive to UV-light of only a limited range of frequencies. If multiple UV-sensitive lines 116 are thus used which do not have overlapping ranges of frequencies, the use of distinct UV-light fixtures 104 may be required and/or desired. For example, children could use a first UV-light fixture 104 to reveal a first set of UV-sensitive lines they trace with a pencil of a certain thickness and/or know to color a certain color (e.g. red). Then, could use a second UV-light fixture 104 to reveal a second set of UV-sensitive lines they trace with a pencil of a different thickness and/or know to color a certain color (e.g. blue). In this way, near-infinite permutations of puzzles and/or activities can be achieved through use of the present invention.

A kit 120 including the grip 100, markers 110, coloring book, individual coloring pages, and the like, can be provided such that children do not have to individually aggregate the items featured in the UV-light drawing activity unless they so choose (e.g. because they already own some of the materials). In such kits 120, collectables, such as stickers, glitter, beads, and the like, can be used in combination with or aggregated into the coloring/tracing activity kit 120, so as to provide children with a third, optional step to enhance the options a child has when creating a drawing.

Plastic surface mats can also be included to facilitate cleanliness of the surface which lies under the child's coloring experience. For example, the plastic surface mat can be of a dark color so as to better contrast the invisible lines 116 located on the individual coloring pages. Product packaging 90 can also be included with the kit 120 disclosed herein. Such product packaging 90 may be useful for shipping kits to children in a compact manner prior to first play. The product packaging 90 may completely subsume the coloring book and all of the components therein or may only encompass a portion thereof. The product packaging 90 will typically include plastics, thermoplastics, glass, wood, wood wool, paper, paperboard, corrugated cardboard, other biodegradable or recyclable materials, and/or the like. Optionally, the product packaging 90 can include a product and/or source identifier, such as a word or trade mark, on the packaging; a viewing window 92 for viewing at least one component and/or the entirety of the toy system or kit on or near the product packaging; instructions for assembling and/or using the grip 100 in connection with the UV-light drawing activity; a hang tab from which the packaging can hang from shelves in public stores; and/or perforations, folds, pull strings, and/or other predefined points of failure which facilitate ripping, cutting, and/or opening the product packaging. The product packaging should be selectively placed on shelves and/or in store locations such that the kit is best marketed to/for children.

The present disclosure is not limited to the specific kits 120 shown and described above. Those kits not shown which remove or add/substitute other crafting materials for those components in kit 120 are expressly envisioned. For example, crafting materials such as paper, plastic, textiles (wool, silk, cotton, flax, jute, bamboo, nylon, polyester, acrylic, rayon), polar fleece, flannel, tartan, denim, leather and artificial leather, felt, fiber, chenille yarn, cork, plush, soil, paperboard, etc., can be used in lieu of or in addition to the coloring book and coloring pages. Additionally, suitable mediums other than those crafting materials previously listed, such as some types of toys, can be used and can include invisible, UV-sensitive lines 116.

Still yet other systems and/or kits exist which employ similar inventive principles with other crafting materials and UV-light fixtures. For example, where plastic sheets are substituted for coloring pages, a slide (overhead) projector such as the common opto-mechanical device for showing photographic slides commonly employed in U.S. schools in the 1990s can be used. Said overhead projector adapted with a black-light so as to capably reveal distinct UV-sensitive objects and/or patterns which are formed from invisible, UV-sensitive lines 116 on said plastic sheets.

A person may be broadcasted by way of an electronic recording device on a social media platform engaging in the UV-light drawing activity. For example, children can share with other children finished drawings, which may potentially lead to the children comparing and/or trading their finished drawings of their collection with other children. Said sharing may occur via any suitable wireless/wired electronic network and/or social media platforms.

From the foregoing, it can be seen that the present invention accomplishes at least all of the stated objectives.

LIST OF REFERENCE CHARACTERS

The following reference characters and descriptors are not exhaustive, nor limiting, and include reasonable equivalents. If possible, elements identified by a reference character below and/or those elements which are near ubiquitous within the art can replace or supplement any element identified by another reference character.

90 product packaging
92 viewing window
100 grip
102 silicone body

104 UV-light fixture
108 cavity for drawing utensil
110 drawing utensil (e.g. marker, colored pencil, etc.)
116 invisible, UV-sensitive lines
120 UV-light drawing activity kit

EXAMPLE EMBODIMENTS

The inventions are defined in the claims. However, the below paragraphs provide a non-exhaustive list of non-limiting embodiments. Any one or more of the features of these embodiments may be combined with any one or more features of another example, embodiment, or aspect described herein.

1. A kit (120) for a drawing activity comprising:
a grip (100) comprising a silicone body (102), said grip (100) configured encompass at least a portion of a utensil;
a UV-light fixture (104) made integral with, or removable with respect to, the grip (100);
a crafting material having a distinct object and/or pattern (116) revealed when UV-light is shone thereon; and
at least one drawing utensil (110).→

2. The kit (120) of paragraph 1 wherein the UV-light fixture (104) is powered by a battery (106).

3. The kit (120) of paragraph 2 further comprising a spare battery.

4. The kit (120) of any one of paragraphs 1-3 wherein the grip (100) is a snap-on grip.

5. The kit (120) of any one of paragraphs 1-4 wherein the grip (100) is ornamentally shaped or comprises an ornamental design printed thereon.

6. The kit (120) of any one of paragraphs 1-5 wherein the grip (100) comprises an elastic material and a cavity (108) such that the grip is configured to:
(a) stretch beyond an outer perimeter of the drawing utensil (110);
(b) pull over the silicone body (102) to a desired position before the drawing activity commences; and
(c) elastically revert to a configuration which snuggly contacts the outer perimeter of the drawing utensil (110).

7. The kit (120) of paragraph 6 wherein a frictional force of the grip substantially resists movement of the grip (100) in the axial direction of the drawing utensil (110) during use.

8. The kit (120) of any one of paragraphs 1-7 wherein the distinct object and/or pattern (116) revealed depicts an animal.

9. The kit (120) of any one of paragraphs 1-8 wherein the distinct object and/or pattern (116) revealed is a color by symbol system.

10. The kit (120) of paragraph 9 wherein the symbol system includes alphanumeric characters.

11. The kit (120) of any one of paragraphs 1-10 further comprising stickers, glitter, and/or beads.

12. The kit (120) of any one of paragraphs 1-10 further comprising packaging for housing components of the kit (120).

13. The kit (120) of paragraph 12 wherein the packaging includes a product or source identifier.

14. The kit (120) of any one of paragraphs 12-13 wherein the packaging includes a viewing window (92).

15. The kit (120) of any one of paragraphs 12-14 wherein (a) printed somewhere on the packaging or (b) included therewithin are instructions for performing the drawing activity.

16. The kit (120) of any one of paragraphs 12-15 wherein the packaging includes a hang tab.

17. The kit (120) of any one of paragraphs 12-16 wherein the packaging includes perforations.

18. The kit (120) of any one of paragraphs 1-17 wherein the utensil comprises the drawing utensil (110) and further wherein the drawing utensil (110) comprises utensils which deliver opaque markings selected from the group consisting of: washable markers, colored pencils, lead pencils, pens, and crayons.

19. The kit (120) of any one of paragraphs 1-18 wherein the utensil comprises a magnifying glass.

20. The kit (120) of any one of paragraphs 1-19 wherein the drawing utensil (110) comprises a UV marker for delivering other UV-sensitive invisible markings and/or lines (116) onto a collection of pages.

21. A method of play comprising:
fitting a grip (100) comprising a UV-light fixture (104) attached thereto or located therewithin onto a drawing utensil (110);
shining UV-light with a UV-light fixture (104) onto a crafting material so as to reveal a distinct object and/or pattern (116); and
tracing and/or coloring the distinct object and/or pattern (116).

22. The method of paragraph 21 further comprising assigning colors to symbols revealed within the distinct object and/or pattern (116).

23. The method of any one of paragraphs 21-22 claim further comprising, for the crafting material, initially providing a page within a coloring book, pocketbook, or pamphlet.

24. The method of paragraph 23 further comprising removing the page by ripping a perforation located near a binding of the coloring book, pocketbook or pamphlet.

25. The method of any one of paragraphs 21-24 further comprising recording one or more steps of the method within an electronic recording device.

26. The method of any one of paragraphs 21-25 further comprising broadcasting one or more steps of the method via social media.

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The term "play" can be used herein as an adjective, a verb, a noun, or any other suitable part of speech given proper context. As an adjective, "play" means relating to an activity engaged in for enjoyment and recreation, especially by children. As a verb, "to play" means to engage in a game or activity for enjoyment or recreation. As a noun, "play" means an activity engaged in for enjoyment and recreation.

The term "craft" concerns an activity involving skill in making things by hand. A "crafting material" as used herein refers to a raw product used for children's arts and crafts and/or play activities.

A "light fixture", "light fitting", or "luminaire" is an electrical device that contains an electric lamp that provides illumination. All light fixtures have a fixture body and one or more lamps. The lamps may be in sockets for easy replacement—or, in the case of some LED fixtures, hard-wired in place.

The "scope" of the present invention is defined by the appended claims, along with the full scope of equivalents to which such claims are entitled. The scope of the invention is further qualified as including any possible combination of any of the aspects of any of the embodiments disclosed to result in additional embodiments, combinations, subcombinations, or the like that would be obvious to those skilled in the art.

What is claimed is:

1. A kit for a drawing activity comprising:

a removable grip comprising a silicone body, said grip configured encompass at least a portion of at least one drawing utensil that is separable from said removable grip;

a UV-light fixture made integral with the grip;

a crafting material having a distinct object and/or pattern revealed when UV-light is shone thereon, wherein the distinct object and/or pattern comprises different types of UV-invisible ink selected from the group consisting of: opaque, semi-opaque, and translucent inks and the different types of UV-invisible ink do not have overlapping ranges of frequencies for revealing UV-sensitive lines in the distinct object and/or pattern; and the at least one drawing utensil;

wherein the distinct object and/or pattern revealed is a color by symbol system.

2. The kit of claim 1 wherein the UV-light fixture is powered by a battery.

3. The kit of claim 2 further comprising a spare battery.

4. The kit of claim 1 wherein the grip is a snap-on grip.

5. The kit of claim 1 wherein the grip is ornamentally shaped or comprises an ornamental design printed thereon.

6. The kit of claim 1 wherein the grip comprises an elastic material and a cavity such that the grip is configured to:

(a) stretch beyond an outer perimeter of the drawing utensil;

(b) pull over the silicone body to a desired position before the drawing activity commences; and (c) elastically revert to a configuration which snuggly contacts the outer perimeter of the drawing utensil.

7. The kit of claim 6 wherein a frictional force of the grip substantially resists movement of the grip in the axial direction of the drawing utensil during use.

8. The kit of claim 1 wherein the distinct object and/or pattern revealed depicts an animal.

9. The kit of claim 1 wherein the distinct object and/or pattern revealed is a color by symbol system.

10. The kit of claim 9 wherein the symbol system includes alphanumeric characters.

11. The kit of claim 1 further comprising stickers, glitter, and/or beads.

12. The kit of claim 1 further comprising packaging for housing components of the kit.

13. The kit of claim 12 wherein the packaging includes a product or source identifier.

14. The kit of claim 12 wherein the packaging includes a viewing window.

15. The kit of claim 12 wherein (a) printed somewhere on the packaging or (b) included therewithin are instructions for performing the drawing activity.

16. The kit of claim 12 wherein the packaging includes a hang tab.

17. The kit of claim 12 wherein the packaging includes perforations.

18. The kit of claim 1 wherein the utensil comprises the drawing utensil and further wherein the drawing utensil comprises utensils which deliver opaque markings selected from the group consisting of: washable markers, colored pencils, lead pencils, pens, and crayons.

19. The kit of claim 1 wherein the utensil comprises a magnifying glass.

20. The kit of claim 1 wherein the drawing utensil comprises a UV marker for delivering other UV-sensitive invisible markings and/or lines onto a collection of pages.

21. A method of play comprising:

fitting a removable grip comprising a UV-light fixture made integral with said grip onto a drawing utensil that is separable from said removable grip, such that the removable grip encompasses a portion of the drawing utensil;

shining UV-light with the UV-light fixture onto a crafting material so as to reveal a distinct object and/or pattern, wherein the distinct object and/or pattern comprises different types of UV-invisible ink selected from the group consisting of: opaque, semi-opaque, and translucent inks and the different types of UV-invisible ink do not have overlapping ranges of frequencies for revealing UV-sensitive lines in the distinct object and/or pattern; and tracing and/or coloring the distinct object and/or pattern, wherein the distinct object and/or pattern revealed is a color by symbol system.

22. The method of claim 21 further comprising assigning colors to symbols revealed within the distinct object and/or pattern.

23. The method of claim 21 claim further comprising, for the crafting material, initially providing a page within a coloring book, pocketbook, or pamphlet.

24. The method of claim 23 further comprising removing the page by ripping a perforation located near a binding of the coloring book, pocketbook or pamphlet.

25. The method of claim 21 further comprising recording one or more steps of the method within an electronic recording device.

26. The method of claim 21 further comprising broadcasting one or more steps of the method via social media.

* * * * *